UNITED STATES PATENT OFFICE.

FERDINAND VALTON, OF PARIS, AND JULES EUVERTE AND ALEXANDRE POURCEL, OF TERRE NOIRE, LOIRE, FRANCE, ASSIGNORS TO ALEXANDER L. HOLLEY, OF BROOKLYN, NEW YORK.

IMPROVEMENT IN MAKING STEEL CASTINGS WITHOUT BLOW-HOLES.

Specification forming part of Letters Patent No. 214,210, dated April 8, 1879; application filed July 22, 1878; patented in France, May 17, 1876.

*To all whom it may concern:*

Be it known that we, FERDINAND VALTON, of Paris, in the Republic of France, and JULES EUVERTE and ALEXANDRE POURCEL, of Terre Noire, Loire, France, have invented new and useful Improvements in Processes of Making Steel Castings Without Blow-Holes, of which the following is a specification, and for which improvements French Letters Patent were granted to our representatives, the Compagnie des Fondéries et Forges de Terre Noire, La Voulte et Besseges, May 17, 1876.

The object of our invention is the production of articles of cast-steel without blow-holes, and also sound and strong, and possessing in a great degree the physical qualities of forged steel. We attain this object by the application in the process of manufacturing the steel of silicon and manganese with iron containing carbon, in a manner to be hereinafter fully described.

It has long been known that silicon tends to prevent the formation of blow-holes in steel castings. The theory of its action may be stated as follows: Blow-holes are known to be filled with carbonic oxide, presumably produced by the reaction of the oxide of iron on the carbon present; but when silicon is present it decomposes the carbonic oxide by taking up its oxygen. The carbon set free is dissolved in the metal and the silica is diffused throughout it. This silica combines with iron, forming silicate of iron, which, being but slightly fluid, remains in the metal, preventing its homogeneity and making it both red-short and cold-short. As the metal is more or less oxidized during its manufacture—for instance, in the Bessemer or in open-hearth processes—the foregoing reactions will accordingly vary more or less in degree, and consequently the product will vary in composition and quality, so that while the mere addition of silicon to the metal may prevent blow-holes, the product will not be strong and uniform.

Our invention, which overcomes these difficulties, may be practiced in either the open-hearth furnace, the Bessemer converter, or the crucible.

We will first describe the operation in the open-hearth furnace. The charge is made up of three things—first, the initial charge; second, the softening materials; and, third, the final additions.

The material most suitable for the initial charge is an ordinary spiegeleisen, for the following reason: The final additions contain silicon and manganese, which have a high affinity for oxygen, and will take it out of oxide of iron. Therefore it is important to prevent, as far as possible, the formation of oxide of iron during the process, in order that it may not oxidize the final additions and convert them into slag. We therefore provide in the initial charge enough silicon or manganese, or both, (preferably a large proportion of manganese,) to satisfy the oxygen which is present during the process. We prefer to make the initial charge of an ordinary spiegeleisen containing from six to twelve per cent. of manganese, and also containing silicon and carbon in the usual proportions; or this spiegeleisen may be replaced by one richer in manganese, or by ferro-manganese diluted with ordinary pig-iron containing silicon and carbon, in the usual proportions, in sufficient quantity to leave in the mixture the indicated proportion of manganese.

We sometimes make the initial charge of an ordinary pig containing silicon and carbon, and afterward add the manganese in the form of spiegeleisen or ferro-manganese; but we have obtained the best results from making the charge of spiegeleisen, as before described.

When the initial charge is melted, it then becomes the initial bath, and the softening materials are added as in the ordinary Martin practice. The selection of these materials depends upon the desired grade of the product. If a hard product is wanted, materials like steel-scrap or Bessemer-rail ends should be used; but if a softer grade is required, materials low in carbon, like wrought-iron scrap or charcoal-blooms or puddled blooms, should be employed. We prefer to heat these materials before they are put into the bath; but they may be charged cold.

While the operation is going on slag-tests are taken by dipping a bar of iron into the bath. If the fracture of the film of slag adhering to the bar presents an olive-green color, manganese is present in sufficient quantity to keep down oxidation. If, however, the slag is black, or nearly so, spiegeleisen, or, preferably, ferro-manganese, must be added to the bath until the proper color is restored to the slag. When, however, the softening materials are melted and the metal tests (to be further described) show that the bath is ready for the final additions, the dark color of the slag should show that only a trace of manganese is left in the bath. If either a large quantity of manganese or a large quantity of oxide of iron were in the bath at this stage, there would be no means of determining the required quantity of the final additions; but when the bath is nearly free from both these substances the final additions can be added in the right quantity to perform their required functions. Metal tests are also taken during the operation, preferably by casting a round ingot, about three inches in diameter and one and one-half inch thick, and hammering it, while still red-hot, into a disk about three-eighths inch thick. The disk is allowed to cool, and then bent cold. When it bears hammering and an amount of bending proportionate to the degree of hardness required in the product, (examples of which will be given,) the final additions should be made to the bath.

The final additions, which are disposed of as hereinafter described, give to the product that freedom from blow-holes and slag and that homogeneity and density which impart the qualities desirable in steel castings.

In order to provide with certainty the necessary amount of the final additions, we have found it requisite to add them in excess of the amounts theoretically required for the reactions hereinafter described, but at the same time in definite proportions. That portion of the final additions not employed in these reactions remains in the final product.

We have specified the manner in which silicon prevents blow-holes, and the fact that after the addition of silicon a slag, chiefly of silicate of iron, remains mixed with the bath. Manganese is added partly for the purpose of freeing the metal from this slag. The theory of its action may be described as follows: In the decomposition of carbonic oxide (which would form blow-holes) by silicon, silica is produced, which combines with the iron, forming a silicate of iron. The manganese combines with the silicate of iron, forming a very fusible slag, which rises to the surface of the bath.

A part of the manganese reduces any oxide of iron that there may be in the bath, and prevents the production of gas by the reaction of this oxide on the carbon.

The final additions essential are silicon and manganese, which we introduce in the form of either a special compound of silicon, manganese, and iron containing carbon, or a siliconized pig-iron and ferro-manganese. A part of the carbon which is required in the product will be left in the bath before the final additions are made; but as the special compound above mentioned and the mixture of siliconized pig-iron and ferro-manganese contain carbon, they impart an additional amount of carbon to the product.

The quantity of silicon and manganese to be added will be governed by the required character of the product. The required silicon will be 0.20 to 0.60 per cent. For hard steels the manganese will be 0.50 to 1.60 per cent., and for soft steels, from 0.20 to 1.20 per cent. Many grades of hardness may be obtained conformably with the varying proportions of silicon, manganese, and carbon.

We will now give several types of the final additions:

First, for hard steel, when the test-disk before described has no radial cracks on the edges above one or two inches deep, and when it will bend cold until the folds are about one inch apart without breaking, and will crack across the bend of a close fold, then we charge the final additions, which consist of fourteen to fifteen per cent. of a special pig-iron of the following composition:

| | |
|---|---:|
| Iron | 84.20 |
| Carbon | 3.20 |
| Silicon | 3.60 |
| Manganese | 9.00 |
| | 100.00 | which will represent a total addition to the charge in the furnace of—

| | |
|---|---:|
| Iron | 12.22 |
| Carbon | 0.46 |
| Silicon | 0.52 |
| Manganese | 1.30 |
| | 14.50 |

A part of the silicon and manganese will perform the reactions described above, while the rest will remain in the product, which will have about the following composition:

| | |
|---|---:|
| Carbon | 0.65 to 0.70 |
| Silicon | 0.45 to 0.50 |
| Manganese | 1.00 to 1.30 |

Or we add eleven per cent. of a pig which has the following composition:

| | |
|---|---:|
| Iron | 91.40 |
| Carbon | 3.60 |
| Silicon | 5.00 | and also two per cent. of ferro-manganese which has the following composition:

| | |
|---|---:|
| Iron | 29.50 |
| Carbon | 5.50 |
| Manganese | 65.00 | which will represent a total addition to the charge in the furnace of—

| | |
|---|---:|
| Iron | 11.81 |
| Carbon | 0.51 |
| Silicon | 0.55 |
| Manganese | 1.30 | a result nearly identical with the one obtained by the first method.

Second, for a medium soft steel, when the test-disk is only rough on the edges, without deep cracks, and when it will bend cold into a close fold without cracking, we charge the final additions, which consist of six per cent. of a special pig, of the following composition:

| | |
|---|---|
| Iron | 71.40 |
| Carbon | 3.60 |
| Silicon | 7.00 |
| Manganese | 18.00 |
| | 100.00 | representing a total addition to the charge in the furnace of—

| | |
|---|---|
| Iron | 4.28 |
| Carbon | 0.22 |
| Silicon | 0.42 |
| Manganese | 1.08 |
| | 6.00 |

Taking into account what may remain in the bath and the losses by reactions, the final product would contain about:

| | |
|---|---|
| Carbon | 0.27 to 0.32 |
| Silicon | 0.35 to 0.38 |
| Manganese | 0.90 to 1.20 |

Or we add six per cent of the following pig:

| | |
|---|---|
| Iron | 91.90 |
| Carbon | 3.10 |
| Silicon | 5.00 |
| | 100.00 | representing an addition of—

| | |
|---|---|
| Iron | 5.51 |
| Carbon | 0.19 |
| Silicon | 0.30 |
| | 6.00 | and also one and a half per cent. of ferro-manganese which has the following composition:

| | |
|---|---|
| Iron | 24.50 |
| Carbon | 5.50 |
| Manganese | 70.00 | representing an addition of—

| | |
|---|---|
| Iron | 0.37 |
| Carbon | 0.08 |
| Manganese | 1.05 |

The total additions will be then:

| | |
|---|---|
| Iron | 5.88 per cent. |
| Carbon | 0.27 per cent. |
| Silicon | 0.30 per cent. |
| Manganese | 1.05 per cent. |

Taking into consideration the circumstances above mentioned, the product would contain about:

| | |
|---|---|
| Carbon | 0.32 to 0.37 |
| Silicon | 0.23 to 0.26 |
| Manganese | 0.90 to 1.20 |

In giving the above proportions of final additions, we of course do not mean to restrict ourselves to the exact proportions given, but have stated them as the formula from which we have obtained the best results. We, however, contemplate varying these proportions within such limits as may be found requisite by reason of the character of the charge in the furnace when the final additions are made.

We obtain the best results by heating these additional ingredients, so as not to cool the furnace just before casting. When pig and ferro-manganese are used separately, the pig is preferably charged first, and when it is nearly all melted the ferro-manganese is thrown in and the bath vigorously rabbled for about one minute. Casting should take place as soon as practicable after the final additions are well mixed, so as not to allow too great a proportion of the silicon and manganese to pass into the slag.

In using our improvements in the Bessemer converter we make the initial charge entirely of pig-iron containing manganese, or we put wrought-iron or steel-scrap into the converter along with the pig-iron or during the conversion.

In order to prevent the development of too great a heat by the oxidation of manganese early in the operation, we prefer to introduce a part of the manganese, which purifies the bath and fits it for the final additions, as hereinbefore fully explained, during the latter part of the process, so that it may be chiefly oxidized by the oxide of iron present rather than by the air blown into the converter.

Slag and metal tests should be taken (by turning down the converter) in the manner and for the purposes hereinbefore described. We find that it requires more care and skill to test and to secure that purification of the charge which fits it for receiving the final additions, as hereinbefore fully explained, than are required in the open-hearth process first described; but equally good results may be obtained.

The use of wrought-iron and steel-scrap in the converter will prevent the generation of too great a heat in the converter. The proportions of wrought-iron and steel-scrap, as well as of manganese, in the charge may be largely varied by one skilled in the art, according to the principles hereinbefore explained. The chemical features of the converter process are very similar to those of the open-hearth process. The important condition is that when the charge is blown it shall be as little oxidized as possible. The final additions are the same in composition and amount as those specified for the open-hearth process.

When the charge in the converter is shown by the slag and metal tests to be ready for the final addition they may be run into the converter or into the ladle in a metal state; but we prefer to put them hot, but unmelted, into the converter. As soon as they are well mixed with the charge casting should take place.

The purification of the initial charge for the final additions forms a part of our improvements as carried out in the open-hearth and Bessemer processes.

A modification of the open-hearth process may be carried out in the crucible, and in such cases the principles of making up the charge are the same as those hereinbefore fully set forth. The greater the oxidation of the bath the greater the amount of manganese needed to purify the charge and to thus prepare it for the final additions.

The manner in which we prefer to practice our process in the crucible is to take the materials already purified instead of purifying them in the crucible. We take wrought-iron or steel-scrap or blister-steel, as in the ordinary crucible process. When a very soft product is desired the charge should be made of wrought-iron. When a harder product is desired a more carburized material should be used.

The silicon and manganese are included in the charge when the crucible is filled, all the materials being put into it cold; or they are added to the charge at any time before pouring; or they may be put into the ladle into which the crucibles are emptied before casting. We prefer to put the silicon and manganese into the crucible along with the charge of wrought-iron or steel-scrap or similar material. The purity of such a material as compared with the crude materials used in the open-hearth or Bessemer processes, and also the small oxidation of the charge in the crucible as compared with the oxidation in the open-hearth furnace and the Bessemer converter, allow a considerable reduction in the amount of final additions.

From about the full amount hereinbefore specified to one-third of that amount (if the materials are very pure and the oxidation very slight) will make a product of the hereinafter-specified physical character, the criterion being the degree of hardness of the product, which those skilled in the art can readily determine.

The metal produced in the open-hearth furnace, or in the Bessemer converter, or in crucibles, may be cast either in cast-iron molds or else in molds made of any suitable materials, such as fire-clay, sand, ground crucibles and fire-brick, &c.

The metal which we have obtained in the manner described above, when properly cast and annealed, has a specific gravity of 7.78 to 7.91. It can be rolled, hammered, forged, and welded without injury.

In order to give it the strength of a forged or rolled steel without forging or rolling, this metal should be carefully annealed and carefully cooled afterward. The time during which annealing is to take place will vary according to the degree of hardness and the thickness of the pieces to be annealed.

The average physical qualities of many samples of this metal, tested after annealing, we give below.

Elastic limit: 26.67 to 28.57; 15.87 to 19.68.
Breaking strain: 53.97 to 57.15; 38.10 to 44.45.
Elongation: 2.5 to 6 per cent.; 13 to 20 per cent.

Weights given in tons (2,240 lbs.) per square inch.

The percentages of carbon, silicon, and manganese in the metal we have obtained in the manner described are about as follows:

Very hard steels:

Carbon .............................. 0.70 to 1.20
Silicon .............................. 0.50 to 0.60
Manganese ......................... 0.70 to 1.60

Very soft steels:

Carbon .............................. 0.18 to 0.30
Silicon .............................. 0.10 to 0.25
Manganese ......................... 0.40 to 1.20

This metal can be used for most purposes in civil, military, and naval construction.

Having thus described the object and nature of our invention, and the best methods known to us of practicing the same, what we claim as new, and desire to secure by Letters Patent, is—

1. The mode herein described of treating a bath of molten iron for making steel castings for the purpose of preventing unsoundness due to the presence of blow-holes, slag, and other impurities in the cast metal, which mode consists in providing the initial bath with manganese, then putting in the scrap or other metal, and finally adding to the charge silicon, manganese, and iron, the iron containing carbon, and the silicon and manganese being in about the proportions specified, substantially as and for the purpose set forth.

2. The mode herein described of treating a bath of molten iron for making steel castings for the purpose of preventing unsoundness due to the presence of blow-holes, slag, and other impurities in the cast metal, which mode consists in adding to the charge silicon, manganese, and iron, the iron containing carbon, and the silicon and manganese being in about the proportions specified, substantially as and for the purpose set forth.

In testimony whereof we have signed our names to this specification in the presence of two subscribing witnesses.

FERDINAND VALTON.
J. EUVERTE.
ALEXANDRE POURCEL.

Witnesses to the signature of F. Valton:
G. BERLINER,
N. HANNEQUIN.

Witnesses to the signature of J. Euverte:
WM. MORTON GRINNELL,
RICHARD B. GRINNELL.

Witnesses to the signature of A. Pourcel:
WM. MORTON GRINNELL,
RICHARD B. GRINNELL.